United States Patent Office 3,812,102
Patented May 21, 1974

3,812,102
PROCESS FOR PRODUCING BENZODIAZEPINE DERIVATIVES
Kikuo Ishizumi, Ikeda, Kazuo Mori, Kobe, Shigeho Inaba, Takarazuka, and Hisao Yamamoto, Nishinomiya, Japan, assignors to Sumitomo Chemical Company, Limited, Osaka, Japan
No Drawing. Filed Aug. 16, 1971, Ser. No. 172,299
Claims priority, application Japan, Aug. 25, 1970, 45/74,702
Int. Cl. C07d 53/06
U.S. Cl. 260—239.3 D    3 Claims

ABSTRACT OF THE DISCLOSURE

A novel process for producing benzodiazepine derivatives represented by the formula,

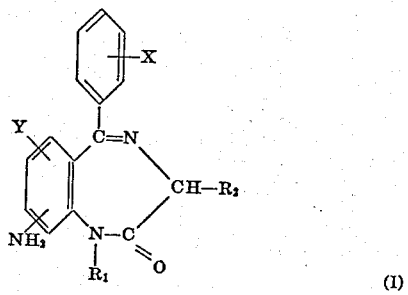

wherein $R_1$ is a hydrogen atom, or a lower alkyl or cycloalkylmethyl group, $R_2$ is a hydrogen atom or a lower alkyl group, X and Y are individually hydrogen or halogen atoms or lower alkyl groups, or acid salts thereof, which comprises reacting a diphthalimidobenzophenone derivative represented by the formula,

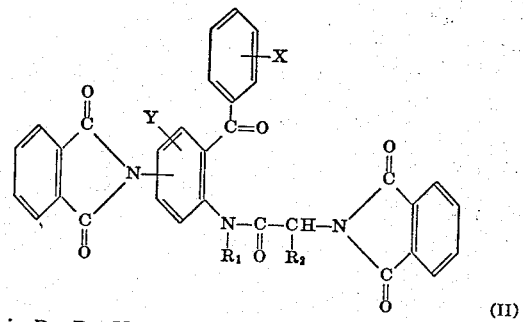

wherein $R_1$, $R_2$, X and Y are the same as defined above, with a hydrazine derivative to obtain the benzodiazepine derivatives of the formula (I).

The benzodiazepine derivatives represented by formula (I) have excellent effects as sedatives, muscle-relaxant, anti-spasmodics, and hypnotics.

---

This invention relates to a novel process for producing benzodiazepine derivatives and salts thereof. More particularly, this invention relates to a process for producing benzodiazepine derivatives represented by the formula (I),

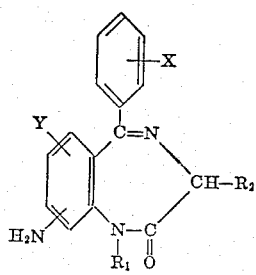

wherein each of X and Y is a hydrogen or halogen atom, or a lower alkyl group, $R_1$ is a hydrogen atom, a lower alkyl or a cycloalkylmethyl group, and $R_2$ is a hydrogen atom or a lower alkyl group, or salts thereof.

This invention relates also to certain novel intermediates which are obtained in carrying out the process of this invention.

That is, according to this invention, there is provided a novel process for producing benzodiazepine derivatives represented by the above-said formula (I), which comprises reacting a diphthalimidobenzophenone derivative represented by the formula (II),

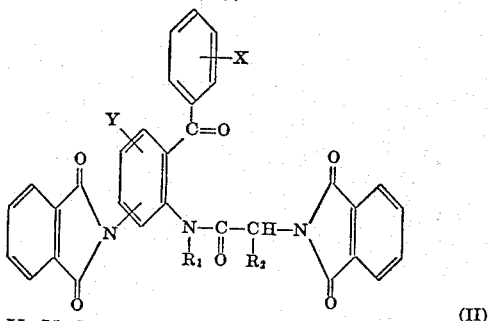

wherein X, Y, $R_1$ and $R_2$ are as defined above, with a hydrazine derivative.

The benzodiazepine derivatives represented by the above-mentioned formula (I) have prominent effects as sedatives, muscle-relaxants, anticonvulsants, anti-spasmodics, and hynotics and are of great importance as medicines. In addition, the benzodiazepine derivatives represented by the above-mentioned formula (I) are also important as intermediates for the production of other benzodiazepines.

In carrying out the process for preparing the benzodiazepine derivatives according to the present invention, a diphthalimidobenzophenone derivative is treated with a hydrazine derivative, such as hydrazine hydrate or phenyl hydrazine in a solvent. An excess amount of hydrazine derivative is preferably employed. Suitable solvents are, for example, chloroform, methanol, ethanol, n-propanol, isopropanol, dimethylsulfoxide, water or a mixture thereof. The reaction proceeds generally at room temperature, but can be conducted while being controlled by heating or cooling.

The diphthalimidobenzophenone derivatives represented by the aforementioned formula (II) used as the starting material in the process of the present invention are novel compounds. These compounds can be prepared by, for example, the following procedure.

In the first step for producing diphthalimidobenzophenone derivatives of the formula (II), a 2-aminomethyl-3-phenyl-nitroindole derivative represented by the formula,

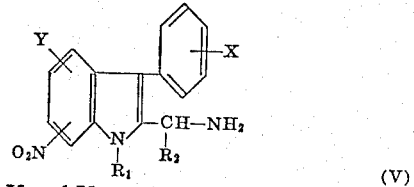

wherein $R_1$, $R_2$, X and Y are the same as defined above, is reduced to the corresponding 2-aminomethyl-3-phenyl-aminoindole derivative represented by the formula,

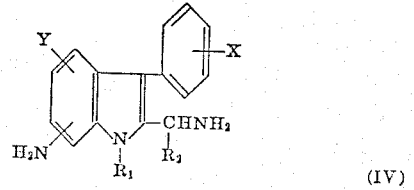

wherein $R_1$, $R_2$, X and Y are as defined above. The reduction is carried out by treating the said 2-aminomethyl-3-phenyl-nitroindole derivative (V) with a reducing agent capable of converting the nitro group into the corresponding amino group. Any one of a wide variety of reducing means may be used to convert the said nitroindole derivative (V) into the corresponding aminoindole derivative (IV). Catalytic hydrogenation, for example, hydrogenation in the presence of a suitable metallic catalyst such as nickel or palladium catalyst, has proved to be a practically advantageous method by which to effect the reduction.

In the second step, the thus obtained 2-aminomethyl-3-phenyl-aminoindole derivative of the formula (IV) is then treated with phthalic anhydride to obtain diphthalimidoindole derivative represented by the formula,

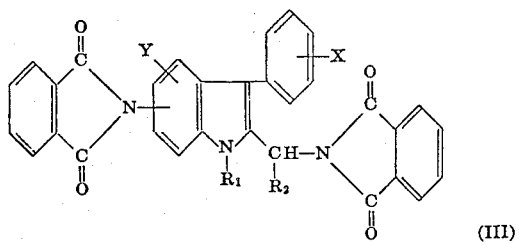

(III)

wherein $R_1$, $R_2$, X and Y are as defined above. The reaction is carried out, for example, by heating the two compounds in the absence or presence of a suitable solvent, such as ethers, alcohols, aromatic hydrocarbons or the like.

In the third step, the thus obtained diphthalimidoindole derivative of the formula (III) is then reacted with an oxidizing agent to obtain diphthalimidobenzophenone derivative of the formula (II). The oxidizing agent for this process includes, for example, ozone, hydrogen peroxide, peracids (e.g. performic, peracetic and perbenzoic acids), chromic acid, sodium periodate, potassium permanganate and manganese dioxide, but is not limited to the named compounds. Preferable oxidizing agent is chromic acid or ozone. Generally, the reaction progresses readily at room temperature, but the temperature may be higher or lower as necessary to effect the desired control of the reaction and the reaction temperature varies also depending upon the oxidizing agent employed. The reaction is preferably effected in the presence of a solvent or solvent mixture. The choice of solvent depends on the oxidizing agent employed, and is selected from the group consisting of water, acetone, carbontetrachloride, acetic acid, sulfuric acid and the like. The oxidizing agent is used in the stoichiometric amount or more.

The thus obtained diphthalimidobenzophenone derivative is reacted with a hydrazine derivative to obtain the benzodiazepine derivative represented by the aforementioned formula (I).

The benzodiazepine derivative formed by the procedure as mentioned above can be isolated as an acid addition salt by treatment with a mineral acid such as, for example, hydrochloric acid, sulfuric acid, or nitric acid, or with an organic acid such as, for example, maleic acid, fumaric acid, succinic acid, formic acid, or acetic acid.

According to the process of the present invention, there are obtained, for example, the following benzodiazepine derivatives:

1-Methyl-5-phenyl-7-amino-1,3-dihydro-2H-1,4-benzodiazepin-2-one
1-Ethyl-5-phenyl-8-amino-1,3-dihydro-2H-1,4-benzodiazepin-2-one
1-Cyclopropylmethyl-5-(o-chlorophenyl)-7-amino-1,3-dihydro-2H-1,4-benzodiazepin-2-one
1-Methyl-5-(p-fluorophenyl)-7-amino-1,3-dihydro-2H-1,4-benzodiazepin-2-one
1-Methyl-5-phenyl-6-chloro-7-amino-1,3-dihydro-2H-1,4-benzodiazepin-2-one
5-Phenyl-6-chloro-7-amino-1,3-dihydro-2H-1,4-benzodiazepin-2-one
5-Phenyl-7-chloro-8-amino-1,3-dihydro-2H-1,4-benzodiazepin-2-one
1-Cyclobutyl-5-phenyl-7-amino-1,3-dihydro-2H-1,4-benzodiazepin-2-one
3 - Methyl-5-phenyl-7-amino-1,3,-dihydro-2H-1,4-benzodiazepin-2-one The present invention is further disclosed in the following examples of more preferable embodiments thereof which are presented for the purpose of illustration and it is not intended to limit the scope of the invention.

EXAMPLE 1

1-Methyl-2-aminomethyl-3-phenyl-5-aminoindole

To 14 g. of Raney nickel, which had been suspended in 500 ml. of ethanol and hydrogenated, was added 15 g. of 1-methyl -2 - aminomethyl-3-phenyl-5-nitroindole. After absorption of 3.8 liters of hydrogen, the mixture was freed from the catalyst by filtration, and the ethanol was removed by distillation under reduced pressure. The residue obtained was purified by chromatography and then recrystallized from isopropanol to give prisms of 1-methyl-2-aminomethyl - 3 - phenyl-5-aminoindole, melting at 105.5°–108° C.

Analysis.—Calcd. for $C_{16}H_{17}N_3$ (percent): C, 76.46; H, 6.82; N, 16.72. Found (percent): C, 76.55; H, 6.62; N, 16.57.

EXAMPLE 2

1-Methyl-2-phthalimidomethyl-3-phenyl-5-phthalimidoindole

A mixture of 1.1 g. of 1 - methyl-2-aminomethyl-3-phenyl - 5 - aminoindole and 1.3 g. of phthalic anhydride was fused by heating in an oil bath for 5 minutes until the inner temperature reached 180° C. After cooling, the solidified mass was disintegrated and washed with tetrahydrofuran to give 1.7 g. of 1 - methyl-2-phthalimidomethyl - 3-phenyl-5-phthalimidoindole, melting at 270°–275° C., which were recrystallized from tetrahydrofuran to yield needles, melting at 277°–278° C.

Analysis.—Calcd. for $C_{32}H_{21}O_4N_3$ (percent): C, 75.13; H, 4.14; N, 8.22. Found (percent): C, 74.92; H, 3.95; N, 8.04.

EXAMPLE 3

1-Methyl-2-phthalimidomethyl-3-phenyl-4-chloro-5-phthalimidoindole

In a manner similar to that in Example 2, 4 g. of 1-methyl-2-aminomethyl-3-phenyl - 4-chloro-5-aminoindole was reacted with 4.15 g. of phthalic anhydride to give crystals of 1 - methyl - 2-phthalimidomethyl-3-phenyl-4-chloro-5-phthalimidoindole, melting at a temperature above 300° C., in quantitative yield. Recrystallization from dimethylformamide yielded pale yellow prisms.

Analysis.—Calcd. for $C_{32}H_{20}O_4N_3Cl$ (percent): C, 70.40; H, 3.69; N, 7.70; Cl, 6.49. Found (percent): C, 70.77; H, 3.79; N, 7.89; Cl, 6.08.

EXAMPLE 4

2-(N-phthalimidoacetyl-N-methyl)-amino-5-phthalimidobenzophenone

To a suspension of 2.0 g. of 1-methyl-2-phthalimidomethyl-3-phenyl-5-phthalimidoindole in 20 ml. of acetic acid was added dropwise a solution of 1.3 g. of chromic anhydride in 1.3 ml. of water, and the mixture was stirred at room temperature for 16 hours. The reaction solution was diluted with 30 ml. of water, and made alkaline by adding 35 ml. of 28%-ammonia. The resultant precipitate was collected by filtration to give 1.86 g. of 2-(N-phthalimidoacetyl - N - methyl)-amino-5-phthalimidobenzophenone. On recrystallization from dimethylformamide, colorless needles, melting at 243°–244° C., was obtained.

*Analysis.*—Calcd. for $C_{32}H_{21}O_6N_3$ (percent): C, 70.71; H, 3.89; N, 7.73. Found (percent): C, 70.79; H, 3.75; N, 74.74.

EXAMPLE 5

2-(N'-phthalimidoacetyl-N-methyl)amino-4-chloro-5-phthalimidobenzophenone

In a manner similar to that in Example 4, 4.0 g. of 1 - methyl - 2 - phthalimidomethyl-3-phenyl-4-chloro-5-phthalimidoindole was oxidized to give 3.40 g. of 2-(N'-phthalimidoacetyl-N-methyl)-amino - 4 - chloro-5-phthalimido-benzophenone melting at above 300° C. On recrystallization from dimethylformamide, prisms were obtained.

*Analysis.*—Calcd. for $C_{32}H_{20}O_6N_3Cl$ (percent): C, 66.50; H, 3.49; N, 7.27; Cl, 6.13. Found: (percent): C, 66.65; H, 3.67; N, 7.68; Cl, 5.86.

EXAMPLE 6

1-Methyl-5-phenyl-7-amino-1,3-dihydro-2H-1,4-benzodiazepin-2-one

To a solution of 1.0 g. of 2-N'-phthalimido-acetyl-N-methyl) - amino - 5 - phthalimidobenzophenone in a mixture of 10 ml. of ethanol and 10 ml. of chloroform was added a solution of 0.5 g. of hydrazine hydrate in 0.5 ml. of water, and the mixture was left standing at room temperature for 19 hours. After removing the solvent by distillation under reduced pressure, the residue was distributed between 10 ml. of 10%-ammonia and 70 ml. of chloroform. The chloroform layer was separated, and extracted with 70 ml. of 5%-hydrochloric acid. The acidic solution obtained was made alkaline by adding concentrated ammonia, and again extracted with chloroform. The chloroform layer was washed with water and dried over sodium sulfate. The chloroform was removed by distillation under reduced pressure to leave 0.49 g. of 1 - methyl - 5 - phenyl - 7 - amino - 1,3-dihydro-2H-1,4-benzodiazepin-2-one, which was recrystallized from isopropanol to give pale yellow needles, melting at 226.5°–227.5° C.

*Analysis.*—Calcd. for $C_{16}H_{15}ON_3$ (percent): C, 72.43; H, 5.70; N, 15.84. Found (percent): C, 72.58; H, 5.72; N, 15.48.

Similarly, the following compounds were obtained:

5 - Phenyl-7-amino-1,3-dihydro-2H-1,4-benzodiazepin-2-one, M.P. 228°–230° C.

5 - (o - Fluorophenyl) - 7 - amino-1,3 - dihydro-2H-1,4-benzodiazepin-2-one, M.P. 265°–266.5° C.

5 - (o - Chlorophenyl) - 7-amino - 1,3-dihydro-2H-1,4-benzodiazepin-2-one, M.P. 229°–231° C.

What is claimed is:

1. A process for producing a compound of the formula

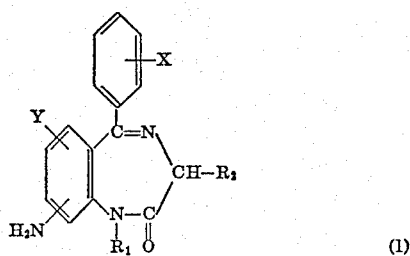

(I)

wherein $R_1$ is a hydrogen atom, a lower alkyl or cycloalkylmethyl group, $R_2$ is a hydrogen atom or a lower alkyl group, X and Y are individually hydrogen or halogen atoms or lower alkyl groups, or salts thereof, which comprises reacting a diphthalimidoindole derivative represented by the formula,

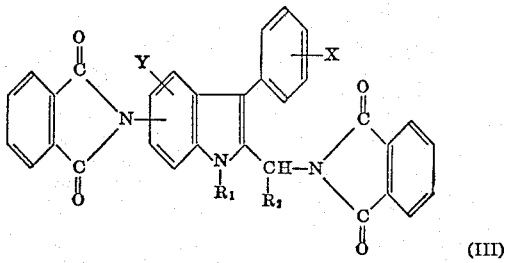

(III)

wherein $R_1$, $R_2$, X and Y are the same as defined above, with the stoichiometric amount or more of an oxidizing agent selected from the group consisting of ozone, hydrogen peroxide, performic acid, peracetic acid, perbenzoic acid, chromic acid, sodium periodate, potassium permanganate and manganese dioxide in the presence of a solvent selected from the group consisting of water, acetone, carbon tetrachloride, acetic acid and sulfuric acid to obtain a diphthalimidobenzophenone derivative represented by the formula,

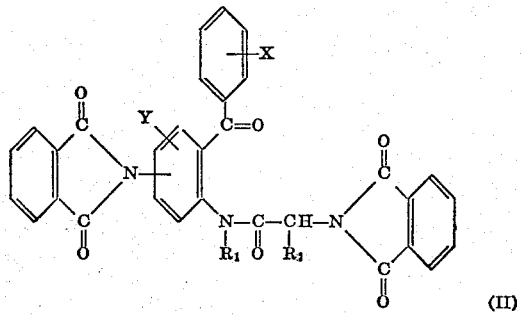

(II)

wherein $R_1$, $R_2$, X and Y are the same as defined above, then reacting the resultant diphthalimidobenzophenone derivative of the formula (II) with a hydrazine derivative selected from the group consisting of hydrazine hydrate or phenyl hydrazine in a solvent selected from the group consisting of chloroform, methanol, ethanol, n-propanol, isopropanol, dimethylsulfoxide, water and a mixture thereof at a temperature from room temperature to the boiling point of the solvent employed to form the benzodiazepine derivative of the formula (I), and further if necessary, treating the resultant benzodiazepine derivative with an acid to obtain the corresponding acid salt thereof.

2. A process for producing a compound of the formula (I), which comprises heating a aminoindole derivative represented by the formula,

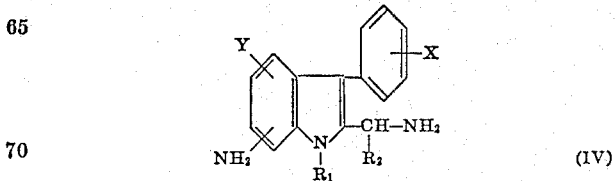

(IV)

wherein $R_1$, $R_2$, X and Y are the same as defined in claim 1, with phthalic anhydride in the absence or presence of a solvent selected from the group consisting of ethers, alcohols and aromatic hydrocarbons to obtain diphthalimidoindole derivative represented by the formula,

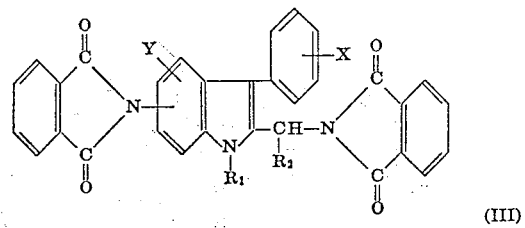

(III)

wherein $R_1$, $R_2$, X and Y are the same as defined in claim 1, then reacting the resultant diphthalimidoindole derivative of formula (III) with an oxidizing agent selected from the group consisting of ozone, hydrogen peroxide, performic acid, peracetic acid, perbenzoic acid, chromic acid, sodium periodate, potassium permanganate or manganese dioxide in the same manner as in claim 1 to obtain a diphthalimidobenzophenone derivative represented by the formula,

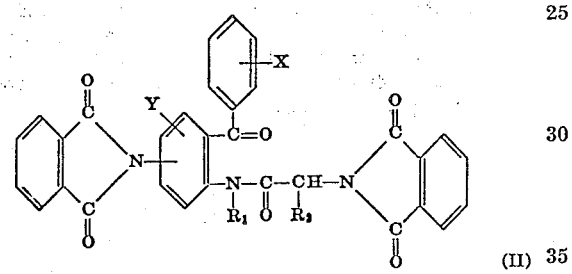

(II)

wherein $R_1$, $R_2$, X and Y are the same as defined in claim 1, then reacting the resultant diphthalimidobenzophenone derivative of the formula (II) with a hydrazine derivative selected from the group consisting of hydrazine hydrate or phenyl hydrazine in the manner as in claim 1 to form the benzodiazepine derivative of the formula (I), and further, if necessary, treating the resultant benzodiazepine derivative with an acid to obtain the corresponding acid salt thereof.

3. A process for producing a compound of the formula (I), which comprises subjecting to catalytic hydrogenation in the presence of a metallic catalyst selected from the group consisting of nickel and palladium catalysts a nitroindole derivative represented by the formula,

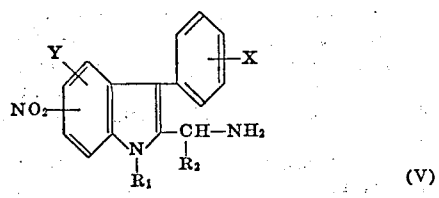

(V)

wherein $R_1$, $R_2$, X and Y are the same as defined in claim 1, to form an aminoindole derivative represented by the formula,

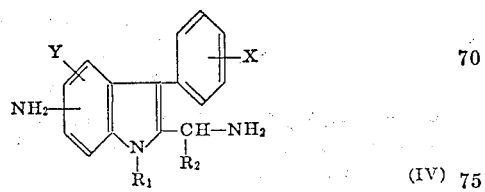

(IV)

wherein $R_1$, $R_2$, X and Y are the same as defined in claim 1, treating the resultant aminoindole derivative of formula (IV) with phthalic anhydride in the same manner as in claim 2 to obtain diphthalimidoindole derivative represented by the formula,

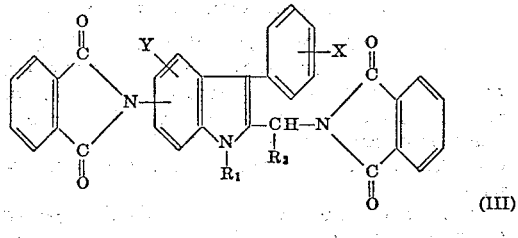

(III)

wherein $R_1$, $R_2$, X and Y are the same as defined in claim 1, then reacting the resultant diphthalimidoindole derivative of the formula (III) with an oxidizing agent selected from the group consisting of ozone, hydrogen peroxide, performic acid, peracetic acid, perbenzoic acid, chromic acid, sodium periodate, potassium permanganate or manganese dioxide in the same manner as in claim 1 to obtain a diphthalimidobenzophenone derivative represented by the formula,

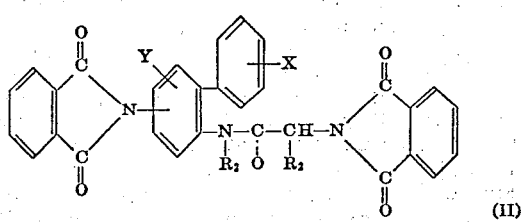

(II)

wherein $R_1$, $R_2$, X and Y are the same as defined in claim 1, then reacting the resultant diphthalimidobenzophenone derivative of the formula (II) with a hydrazine derivative selected from the group consisting of hydrazine hydrate or phenyl hydrazine in the same manner as in claim 1 to form the benzodiazepine derivative of the formula (I), and further, if necessary, treating the resultant benzodiazepine derivative with an acid to obtain the corresponding acid salt thereof.

References Cited
FOREIGN PATENTS 6500446   7/1965   Netherlands _____ 260—239.3 D

OTHER REFERENCES

Noller, "Chemistry of Organic Compounds," second ed. (Saunders) (1957) p. 553.

Beilstein, "Handbuch der Organischen Chemie" 4th ed., vol. 21, main work, pp. 464–468.

Fieser et al.: "Advanced Organic Chemistry" (Reinhold) (1961) pp. 1042–1044.

HENRY R. JILES, Primary Examiner

R. T. BOND, Assistant Examiner

U.S. Cl. X.R.

260—326, 326.15, 999